United States Patent [19]

Goodman

[11] Patent Number: 4,683,259

[45] Date of Patent: Jul. 28, 1987

[54] RESIN COMPOSITIONS COMPRISING ORGANOCLAYS OF IMPROVED DISPERSIBILITY

[75] Inventor: Howard Goodman, St. Austell, United Kingdom

[73] Assignee: ECC International Limited, St. Austell, England

[21] Appl. No.: 928,847

[22] Filed: Nov. 7, 1986

Related U.S. Application Data

[63] Continuation-in-part of Ser. No. 765,259, Aug. 13, 1985, Pat. No. 4,631,091.

[51] Int. Cl.[4] .......................... C08K 3/34; C04B 14/00
[52] U.S. Cl. ...................................... 524/447; 106/309
[58] Field of Search ........................... 106/308 N, 309; 524/447

[56] References Cited

U.S. PATENT DOCUMENTS

| | | |
|---|---|---|
| 4,105,578 | 8/1978 | Finlayson et al. |
| 4,412,018 | 10/1983 | Finlayson et al. |
| 4,558,075 | 12/1985 | Suss et al. ............................ 524/447 |
| 4,623,398 | 11/1986 | Goodman et al. ............... 106/308 N |
| 4,631,091 | 12/1986 | Goodman ....................... 106/308 N |

*Primary Examiner*—Theodore Morris
*Attorney, Agent, or Firm*—Stefan J. Klauber

[57] ABSTRACT

Resin-containing compositions, e.g. unsaturated polyester or epoxy resin compositions, are prepared using an organoclay of improved dispersibility. The organoclay is prepared by suspending a smectite clay in water to form a fluid suspension; treating the suspension with a solution of an inorganic salt, the cation of which has a valency of at least two, the concentration of the salt being such as to flocculate the smectite clay substantially completely; mixing the suspension of the flocculated smectite clay with a quaternary ammonium compound, at least one of the four alkyl groups of which has from 10 to 24 carbon atoms; and dewatering the resultant product.

15 Claims, No Drawings

RESIN COMPOSITIONS COMPRISING ORGANOCLAYS OF IMPROVED DISPERSIBILITY

This application is a continuation-in-part of U.S. Ser. No. 765,259, filed Aug. 13, 1985. now U.S. Pat. No. 4,631,091.

FIELD OF THE INVENTION

This invention relates to organoclays of improved dispersibility in organic media and to their applications in resin compositions, particularly for coating and forming purposes.

BACKGROUND OF THE INVENTION

An organoclay is an organophilic cation-modified clay derived from a clay mineral, generally of the smectite group, for example a bentonite, montmorillonite, hectorite, saponite or the like, by replacing the inorganic exchangeable cations, which occur in the natural clay mineral, by organic cations, each comprising at least one hydrocarbon radical which has sufficient carbon atoms to render the surface of the cation-exchanged clay hydrophobic.

Organoclays have been found to be very useful as thixotropic agents in organic media such as, for example, lubricating greases, oil-based drilling fluids, paints, varnishes, enamels and printing inks. However, an organoclay is, in general, difficult to disperse in an organic medium to form the uniform gel structure which is required to thicken, or to increase the viscosity of, the organic medium. Various means have accordingly been used to improve the dispersibility of an organoclay in an organic medium, including the use of a polar organic material, such as a low molecular weight alcohol or ketone, as a dispersing aid, and the use of an excess of a specially selected organic cation in the preparation of the organoclay.

In Finlayson et al, U.S. Pat. No. 4,105,578, an organophilic clay gellant having enhanced dispersibility in organic systems is disclosed which comprises the reaction product of a methyl benzyl dialkyl ammonium compound wherein the compound contains 20 to 35% alkyl groups having 16 carbon atoms, and 60 to 75% alkyl groups having 18 carbon atoms, and a smectite-type clay having a cation exchange capacity of at least 75 milliequivalents per 100 grams of said clay, and wherein the amount of said ammonium compound is from 100 to 120 milliequivalents per 100 grams of said clay, 100% active clay basis.

In Finlayson et al, U.S. Pat. No. 4,412,018, an organophilic clay gellant and methods of using and making the same are disclosed, which comprises the reaction product of an organic cation, an organic anion and a smectite-type clay having a cation exchange capacity of at least 75 milliequivalents per 100 grams of said clay, such that an organic cation-organic anion complex is intercalated with the smectite-type clay and the cation exchange sites of the smectite-type clay are substituted with the organic cation. The examples of the patent illustrate the use of the organophilic clay in thixotropic unsaturated polyester compositions and in thixotropic coating compositions.

In our application, Ser. No. 765,259 filed Aug. 13, 1985, there is described a method which improves the ease of dispersibility of organoclays in organic liquid compositions and avoids the need to provide high shear mixing equipment and the expenditure of the large amounts of energy which are required for the high shear mixing as disclosed in Ser. No. 727,022 filed Apr. 25, 1985.

In particular, this method yields an organoclay which can be dispersed readily into unsaturated polyester solutions. Unsaturated polyester compositions containing various gelling agents are well-known. Additionally, it is known that in the preparation of glass fiber laminates of unsaturated polyester and the like, thixotropic gelling agents are used which allow for the ready mixing and spraying of these resins at high shear rates. At low shear rates, however, these gelling agents greatly increase the viscosity of the polyester, thus avoiding the drainage of the resin on vertical surfaces.

One of the most widely used gelling agents for unsaturated polyesters was asbestos fibers. Asbestos fibers assisted in producing thixotropic polyesters without significantly affecting resin clarity. However, in the past several years, it has become recognized that the use of asbestos under the usual manufacturing conditions is objectionable, because of its long-term adverse effects on health when inhaled. For this reason, the asbestos gelling agents were replaced by a silica aerogel. When about 1% of silica was dispersed in the resin, it provided effective thixotropy. However, such product is comparatively expensive, and because of low bulk density, presents storage and handling problems.

Consequently, the art has turned to the use of organoclays as gelling agents. Conventional organoclays cannot be dispersed in unsaturated polyester solution. They must be predispersed in monomer styrene and the gel subsequently blended with the polyester. This extra stage is expensive and inconvenient. It also limits the amount of organoclay that can be incorporated, to levels which can be physically handled in styrene: above about 8 wt % the gels become unmanageably stiff. Hence there is a need for organoclays which can be stirred directly into polyester solution, like fumed silica.

SUMMARY OF THE INVENTION

The organoclay employed in the present invention is prepared by a method described in U.S. Ser. No. 765,259 which comprises the following steps:

(a) A smectite clay is suspended in water to form a fluid suspension;

(b) The aqueous suspension of the smectite clay is treated with a solution of an inorganic salt, the cation of which has a valency of at least two, the concentration of the salt being such as to flocculate the smectite clay substantially completely;

(c) The suspension of the flocculated smectite clay is mixed with a quaternary ammonium compound at least one of the four alkyl groups of which has from 10 to 24 carbon atoms; and (d) The product of step (c) is dewatered.

In step (b) the valency of the cation is preferably 3, and most preferably the cation is aluminum. If the valency of the cation is 3 the concentration of the solution of the salt containing the cation is preferably in the range of 0.001 M to 0.02 M. If, however, the valency of the cation is 2 the concentration of the solution of the salt containing the cation must be greater and is preferably in the range from about 0.2 M to 2 M.

The suspension of the flocculated clay is preferably mixed with the quaternary ammonium compound in proportions such that there are present from 95 to 140 milliequivalents of quaternary ammonium cation per 100 g of dry clay.

In step (c) the aqueous suspension of the flocculated smectite clay is preferably mixed with molten quaternary ammonium compound. The quaternary ammonium compound preferably has the general formula:

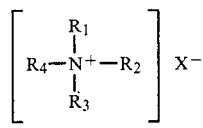

wherein $R_1$ is a saturated or unsaturated alkyl group having from 10 to 24 carbon atoms, $R_2$ and $R_3$, which may be the same or different, are each a saturated or unsaturated alkyl group having from 1 to 24 carbon atoms or an aralkyl group having from 7 to 10 carbon atoms, $R_4$ is an alkyl group having from 1 to 6 carbon atoms or an aralkyl group having from 7 to 10 carbon atoms, and X is OH, Cl, Br, $NO_2$, $CH_3SO_4$ or $CH_3COO$.

Examples of such compounds are the benzyl methyl dialkyl ammonium chlorides, the dimethyl dialkyl ammonium chlorides, the benzyl dimethyl alkyl ammonium chlorides, the benzyl trialkyl ammonium chlorides and the methyl trialkyl ammonium chlorides, where the one or more alkyl group represents a mixture of hydrocarbon radicals derived from tallow having from 14 to 20 carbon atoms but in which $C_{18}$ radicals preferably predominate (a typical analysis of such a mixture of hydrocarbon radicals contained in tallow is: Chd 14 2.0%; $C_{15}$ 0.5%; $C_{16}$ 19.0%; $C_{17}$ 1.5%; $C_{18}$ 66.0% and $C_{20}$ 1.0%). The hydrocarbon radicals may be partially unsaturated as in natural tallow or may be substantially completely saturated as a result of treating the tallow with hydrogen in the presence of a suitable catalyst.

It has been found that these organoclays can readily be incorporated in resin compositions containing resins of various types, in particular, the commonly used alkyd resins, unsaturated polyester resins and epoxy resins.

These organoclays are self-dispersing products for unsaturated polyester/styrene systems, aliphatic organic solvent systems and polar organic solvent systems.

By means of the present invention, there can be provided a novel thixotropic cross-linkable unsaturated polyester composition which has unique rheological properties, for example, a high thixotropic index.

DETAILED DESCRIPTION

The organophilic clays of this invention may be used without the need for a styrene pregel. In particular, polyester compositions may be prepared by mixing the organophilic clay with the final liquid polyester mixture prepared from a liquid unsaturated polyester and unsaturated aromatic monomer. The final polyester compositions can then be cross-linked to produce coatings or glass fiber-reinforced laminates by methods well known in the art.

In a typical procedure the liquid unsaturated polyester resin is mixed in conventional apparatus with an unsaturated aromatic monomer to prepare a solution having a solids content between about 30 and 80% by weight polyester. The organophilic clays of the invention can then be added to the liquid laminating resin.

The unsaturated aromatic monomers of this invention are aromatic compounds to which is bonded one or more ethylenically unsaturated radicals such as a vinyl radical, substituted vinyl radical or an allylic radical. Suitable monomers include styrene, α-methyl styrene, divinyl benzene and allyl benzene. Styrene is preferred due to its effectiveness, wide use and availability. Such monomers are used in cross-linking the polyesters and also act as diluents to reduce viscosity.

The unsaturated polyesters useful in preparing the thixotropic compositions of this invention are polyesters of a dicarboxylic acid and a diol having a major amount of olefinic unsaturation, preferably 10 to 75 olefin groups per 100 ester groups. The olefinic unsaturation is preferably derived from the carboxylic acid although the diol may be unsaturated. Typical diols are ethylene glycol and propylene glycol. Typical unsaturated acids include maleic acid, fumaric acid. Anhydrides of these acids are also commonly used. Such polyesters are made by conventional techniques of esterification as well known in the art. Generally, polyesters having molecular weights of from about 400 to 10,000 and acid numbers in the range of from 0 to 50 mg KOH per gram of resin are useful for preparing the thixotropic composition of this invention.

The amounts of organophilic clay gellant used in polyester laminating resins can range from 0.25% to 10%, preferably 0.5 to 4%. Amounts larger than 10% may be employed but are not economical.

Practice of the present invention will now be illustrated by the following Examples, which however, are to be considered as merely illustrative of the invention, and not delimitive thereof:

EXAMPLE I

Organoclay samples were prepared by the following method:

In each case, an aqueous suspension of bentonite was prepared by mixing raw Wyoming sodium bentonite in a blunger with sufficient water to form a suspension containing 10% by weight of the dry clay. The suspension thus formed was passed through a No. 300 mesh British Standard sieve (nominal aperture 0.053 mm) and the undersize fraction was diluted to about 6% by weight of solids with water and subjected to a particle size separation in an intermittent discharge, continuous centrifuge at a flow rate of 1 litre per minute. The fine fraction was then passed through an homogenizer as a pre-treatment to reduce particle size and increase uniformity. To a 500 g sample of the homogenized fine fraction, there was then added 120 g of a solution containing the calculated weight of either aluminum sulfate ($Al_2(SO_4)_3.16H_2O$) or aluminum chloride ($AlCl_3.6H_2O$) which was required to give the desired concentration of aluminum sulfate in 620 g of the suspension. The suspension was then subjected to stirring by means of a paddle mixer for 30 minutes while the suspension was heated to a temperature of 65° C.

There was then added to the heated suspension the calculated weight of a mixture of quaternary ammonium compound and water and isoproyl alcohol (in which form the quaternary ammonium compound is available in commerce) which was required to give the desired loading of quaternary ammonium compound on dry bentonite. The resultant mixture was then stirred in the paddle mixer for 30 minutes, filtered on a Buchner funnel, washed with hot water and dried for 16 hours at 60° C. in an air-swept oven. The dry product was then milled to pass through a sieve of nominal aperture 0.080 mm.

Various organoclays were prepared according to the above procedure using as the quaternray ammonium compound either dimethyl di(hydrogenated tallow) ammonium chloride (2M2HT) or methyl benzyl di(hydrogenated tallow) ammonium chloride (MB2HT), different concentrations of aluminum sulfate being used in the preparation of the aqueous suspension of bentonite.

Each organoclay was incorporated into an alkyd gloss paint composition which was prepared in the following manner. The following ingredients were first mixed together in the stated proportions by weight:

| Ingredient | Wt. % |
| --- | --- |
| Alkyd resin | 20.0 |
| White spirit | 8.25 |
| Calcium naphthenate | 0.9 |
| Titanium dioxide | 29.8 |
| Methylethyl ketoxime | 0.2 |

When the above composition was thoroughly mixed the following materials were added under stirring in the following order:

| Ingredient | Wt. % |
| --- | --- |
| Alkyd resin | 33.0 |
| White spirit | 6.25 |
| Lead naphthenate | 0.8 |
| Cobalt naphthenate | 0.3 |
| Organoclay | 0.5 |
| Total | 100.0% |

The calcium, lead and cobalt naphthenate are drying agents and the methylethyl ketoxime is an anti-skin agent.

Each paint composition was mixed for 15 minutes using Cowles blade of diameter 41 mm rotating at a speed of 2500 rpm. At the end of this time small samples were taken on a spatula and spread on a Hegman gauge. The size of the largest solid particles present in a significant proportion was read from a Hegman gauge.

The said Hegman Gauge is used to determine the quality of the dispersion of solid particles in an organic liquid medium, and comprises a polished metal plate provided with a rectangular depression of tapering depth which varies uniformly from zero at one end to 100 μm at the other end. A film of the organic liquid composition is spread evenly over the plate and a visual estimate of the coarsest particles present in the composition can be made.

If a substantial number of relatively coarse (10–100 micrometer) particles are present in the composition a definite "front" will be observed which, when compared with a scale provided alongside the depression, indicates the size of the largest particles present. If only a few particles in the above size range are present these will show up as specks in the depression and may be counted. The particulate solid material in a paint composition should be dispersed to such an extent that no front is visible when a sample of the paint is spread on a Hegman gauge and only a very small number, if any, specks can be seen.

Larger samples of the complete alkyd gloss paint compositions were allowed to stand for 24 hours and were then tested for viscosity at 21° C. using a Brookfield Viscometer fitted with spindle No. 2 at 1 rpm. A sample of an alkyd gloss paint composition prepared in an identical manner but containing no organoclay was also tested for viscosity in the same way.

For each sample of organoclay a "viscosity ratio" at 1 rpm was calculated according to the following formula:

Viscosity ratio =

$$\frac{\text{viscosity at 1 rpm of paint composition with organoclay.}}{\text{viscosity at 1 rpm of paint composition without organoclay.}}$$

The results are set forth in Table I below:

TABLE I

| Quaternary Ammonium Compound | Milli-Equivalents Quaternary Ammonium Compound per 100 g clay | Concentration of $Al^{3+}$ ions in Aqueous Suspension (M) | Viscosity ratio at 1 rpm | Gauge Size of Largest Particles (μm) |
| --- | --- | --- | --- | --- |
| 2M2HT* | 132 | 0.001 | 3.8 | 70 |
| 2M2HT | 132 | 0.005 | 3.6 | 40 |
| 2M2HT | 132 | 0.01 | 2.7 | 10 |
| 2M2HT | 132 | 0.02 | n.d. | 10 |
| 2M2HT | 132 | 0.05 | 2.9 | 20 |
| MB2HT** | 122 | 0.001 | n.d. | 80 |
| MB2HT | 122 | 0.0025 | 5.7 | 10 |
| MB2HT | 122 | 0.005 | 4.8 | 10 |
| MB2HT | 122 | 0.0075 | 4.1 | 10 |
| MB2HT | 122 | 0.01 | 3.3 | 10 |

*dimethyl dihydrogenated tallow
**methyl benzyl dihydrogenated tallow

EXAMPLE II

Further samples of organoclays were prepared according to the procedure described in Example I with different loadings of 2M2HT or MB2HT being used in each case. The concentration of aluminum sulfate in the aqueous suspension of bentonite was 0.05 M for each sample containing MB2HT and 0.01 M for 2M2HT. Each organoclay was incorporated into an alkyd gloss paint composition having the same formulation as that in Example I, and each completed paint composition was tested on a Hegman Gauge for the size of the largest solid particles present in a significant proportion.

The results are set forth in Table 2 below:

TABLE 2

| Quaternary Ammonium Compound | Milli-Equivalents Quaternary Ammonium Compound per 100 g clay | Concentration of $Al^{3+}$ ions in Aqueous Suspension (M) | Hegman Gauge Size of Largest Particles (μm) |
| --- | --- | --- | --- |
| 2M2HT | 104 | 0.01 | 40 |

TABLE 2-continued

| Quaternary Ammonium Compound | Milli-Equivalents Quaternary Ammonium Compound per 100 g clay | Concentration of $Al^{3+}$ ions in Aqueous Suspension (M) | Hegman Gauge Size of Largest Particles (μm) |
|---|---|---|---|
| 2M2HT | 115 | 0.01 | 25 |
| 2M2HT | 124.5 | 0.01 | 15 |
| 2M2HT | 131.5 | 0.01 | 10 |
| 2M2HT | 132 | 0.01 | 10 |
| 2M2HT | 134 | 0.01 | 5 |
| 2M2HT | 137 | 0.01 | 5 |
| MB2HT | 102.5 | 0.005 | 70 |
| MB2HT | 103 | 0.005 | 70 |
| MB2HT | 114 | 0.005 | 80 |
| MB2HT | 115 | 0.005 | 60 |
| MB2HT | 122 | 0.005 | 10 |
| MB2HT | 123 | 0.005 | 5 |
| MB2HT | 123.5 | 0.005 | 10 |
| MB2HT | 124 | 0.005 | 10 |
| MB2HT | 135 | 0.005 | 10 |

EXAMPLE III

Further organoclay samples were prepared according to the procedure described in Example I, except that the time for which the mixture of the suspension of the fine bentonite from the centrifuge and the solution of aluminum sulfate was stirred in the paddle mixer was different in each case. In each case there was used 135 meq. of MB2HT per 100 g of dry bentonite, and the concentration of aluminum ions in the aqueous suspension was 0.01 M.

Each organoclay was incorporated into an alkyd gloss paint composition having the same formulation as that in Example I, and each completed paint composition was tested on a Hegman gauge for the size of the largest solid particles present in a significant proportion. Larger samples of each paint composition were also allowed to stand for 24 hours and were then tested for viscosity at 21° C. using a Brookfield Viscometer fitted with spindle No. 2 at speeds of 1 rpm, 5 rpm and 50 rpm respectively.

A sample of the same paint composition, but containing no organoclay was also tested in the same way.

The results are set forth in Table 3 below:

TABLE 3

| Concentration of $Al^{3+}$ ions in Aqueous Suspension (M) | Mixing Time (min) | Hegman Gauge Size of Largest Particles (μm) | Viscosity (mPa.s) at 21° C. at | | |
|---|---|---|---|---|---|
| | | | 1 rpm | 5 rpm | 50 rpm |
| 0.01 | 7 | 20 | 2480 | 1640 | 960 |
| 0.01 | 15 | 5 | 3040 | 1920 | 1000 |
| 0.01 | 30 | 5 | n.d. | n.d. | n.d. |
| 0.01 | 60 | 5 | 2640 | 1680 | 960 |
| Paint Composition Without Organoclay | | 5 | 560 | 584 | 578 |

EXAMPLE IV

In this Example, a series of further organoclay samples were prepared utilizing the procedure of Example I, except that various salts—both with monovalent and multivalent cations—were utilized. More specifically the salts utilized included sodium chloride, lithium chloride, ammonium chloride, calcium chloride, magnesium chloride, ferric chloride and chromium chloride. Various concentrations of the said salt solutions were utilized in accordance with the showing of Table 4. Each resultant organoclay was incorporated into an alkyd gloss paint composition having the same formulation as that in Example I, and each completed paint composition was tested on a Hegman Gauge for the size of the largest solid particles present in a significant proportion. The larger samples of each paint composition were also allowed to stand for 24 hours and were then tested for viscosity at 21° C. using a Brookfield viscometer fitted with a No. 2 spindle at speeds of 1 rpm. The results are set forth in Table 4, which establishes that with monovalent salts, e.g., sodium chloride, or with divalent salts, e.g., calcium chloride, considerably higher concentrations are needed for Hegman dispersion. (It is found that with monovalent salts approximately a 2 to 10 M solution is required). Conversely, when the trivalent aluminum or chromium +3 ion is employed, much lower concentrations are required. While with chromium +3 ion good dispersion is obtained, chromium +3 ion is generally more expensive to utilize than aluminum ion and additionally chromium is less desirable to employ for practical reasons, in that chromium ion can under some conditions be a source of industrial pollution.

TABLE 4

| Salt | Concentration (M) | Amine (130 meq/100 g) | Hegman Gauge After 15 min. (largest particles μm) | Viscosity at 1 rpm after 24 hrs (cP) | Viscosity blank paint (cP) |
|---|---|---|---|---|---|
| NaCl | 2 | 2M2HT | 3(60) | 3280 | 960 |
| LiCl | 2 | 2M2HT | 3(60) | 3000 | 800 |
| NH$_4$Cl | 2 | 2M2HT | 3(60) | 2480 | 800 |
| CaCl$_2$ | 0.3 | 2M2HT | 7(10) | 2000 | 600 |

TABLE 4-continued

| Salt | Concentration (M) | Amine (130 meq/100 g) | Hegman Gauge After 15 min. (largest particles μm) | Viscosity at 1 rpm after 24 hrs (cP) | Viscosity blank paint (cP) |
|---|---|---|---|---|---|
| | 0.5 | 2M2HT | 7(10) | 3040 | 840 |
| | 1.0 | 2M2HT | 6(25) | 2440 | 840 |
| MgCl$_2$ | 0.5 | 2M2HT | 4½(40) | 3680 | 800 |
| | 1 | 2M2HT | 7(10) | 1880 | 600 |
| | 2 | MB2HT | 7(10) | 3400 | 880 |
| FeCl$_3$ | 0.05 | 2M2HT | 5½(30) | 2680 | 1000 |
| | 0.1 | 2M2HT | 4(50) | 2640 | 1000 |
| | 0.2 | 2M2HT | 5(40) | 2760 | 1000 |
| CrCl$_3$ | 0.05 | 2M2HT | 7(10) | — | — |
| | 0.1 | 2M2HT | 7(10) | 3040 | 1000 |
| | 0.2 | 2M2HT | 7(10) | 2800 | 1000 |

EXAMPLE V

Organoclay samples were prepared by the following method.

An aqueous suspension of bentonite was prepared by mixing raw Wyoming sodium bentonite in a blunger with sufficient water to form a suspension containing 10% by weight of dry clay. The suspension thus formed was passed through a No. 300 mesh British Standard sieve (nominal aperture 0.053 mm) and the undersize fraction was diluted to about 4% by weight of solids with water and subjected to a particle size separation in an intermittent discharge, continuous centrifuge at a flow rate of 1 liter per min. The fine fraction was then passed through a homogenizer as a pre-treatment to reduce particle size and increase uniformity. To a 500 g sample of the homogenized fine fraction, enough water was added to make the organoclay reaction solids 2.3% by weight. To this was then added the calculated weight of aluminum chloride (AlCl$_3$.6H$_2$O) which was required to give the desired concentration of aluminum chloride in the suspension. The suspension was then subjected to stirring by means of a paddle mixer for 15 minutes while the suspension was heated to a temperature of 65° C. There was then added to the heated suspension the calculated weight of a mixture of quaternary ammonium compounds and water and isopropyl alcohol (in which form the quaternary ammonium compounds are available in commerce) which was required to give the desired loading of quaternary ammonium compounds on dry bentonite. The resultant mixture was then stirred in the paddle mixer for 30 minutes, filtered on a Buchner funnel, washed with hot water and dried for 1½ hours at 60° C. in a fluid bed drier. The dry product was then milled to the desired particle size.

The various organoclays were prepared according to the above procedure using a mixture of quaternary ammonium compounds comprising 75 mole% dimethyl benzyl hydrogenated tallow ammonium chloride (2MBHT) and 25 mole % dimethyl di(hydrogenated tallow) ammonium chloride (2M2HT), different concentrations of aluminum chloride being used in the preparation of the aqueous suspension of bentonite.

Each organoclay was milled to less than 0.250 mm. 1.5 by weight of each dry organoclay composition was incorporated into an unsaturated polyester resin composition using a laboratory stirrer rotating at 3,500 r.p.m. for 15 mins. The resin was a rapid-curing, general-purpose unsaturated polyester resin, marketed by the Scott Bader Company Limited under the trade name "CRYSTIC 196"(CRYSTIC is a Registered Trademark). It is believed to be a co-polymer of ortho-phthalic acid, fumaric acid and propylene glycol, having a number average molecular weight of about 3,000. Cobalt octoate accelerator was added at 0.01% by weight at the end of the mixing time. Crystic 196 as received from Scott Bader is a 70 percent by weight solution of polyester resin in styrene. This is diluted to 54 percent by weight polyester with extra styrene before use.

The viscosity of the polyester resin composition containing the organoclay as a gelling agent, was measured using a Brookfield RVT Viscometer at spindle speeds of 0.5 r.p.m., 5 r.p.m. and 50 r.p.m. The data are shown in Table 5. Thixotropic Index ratios are also given.

TABLE 5

Thixotropic Index = $\frac{\text{Viscosity in cp at 5 r.p.m.}}{\text{Viscosity in cp at 50 r.p.m.}}$

| Milli-Equivalents Quaternary Ammonium Compound per 100 g clay | Concentration of Al$^{3+}$ ions in Aqueous Suspension M | Viscosity, cp 0.5 r.p.m. | 5 r.p.m | 50 r.p.m | Thixotropic Index |
|---|---|---|---|---|---|
| 110 | 0 | 8400 | 1680 | 500 | 3.36 |
| 110 | 0.001 | 11600 | 2240 | 612 | 3.66 |
| 110 | 0.0025 | 15400 | 2760 | 596 | 3.97 |
| 110 | 0.005 | 4200 | 960 | 344 | 2.79 |
| 100 | 0.0025 | 17000 | 3000 | 724 | 4.14 |
| 105 | 0.0025 | 24000 | 4400 | 965 | 4.56 |
| 110 | 0.0025 | 15000 | 2880 | 708 | 4.07 |
| 115 | 0.0025 | 8200 | 1700 | 496 | 3.43 |
| fumed silica at 1 wt % | — | 17300 | 2944 | 645 | 4.56 |

EXAMPLE VI

Each organoclay, prepared as described in Example V, was milled to less than 0.080 mm and incorporated into component A of a Two-pack Epoxy Enamel.

This 19% pigment volume concentration white paint consists of 2 components, A and B. A is the base containing the epoxy resin; B is the polyamide curing agent solution. The ingredients are listed in their order of addition.

To prepare component A the following were mixed:

| Ingredient | Description/Function | Supplier | Grams |
|---|---|---|---|
| Epikote 1001-X-75 | 75 wt. % solution of epoxy resin in xylene | Shell Chemicals | 157.0 |
| Solvent mixture | 65 wt. % Ethylene glycolmonoethyl ether acetate; 15 wt. % Methyl isobutyl Ketone 20 wt. % Xylene | | 47.5 |
| Beetle 640 | Urea formaldehyde resin, a flow control agent | British Industrial Plastics (BIP) | 7.0 |
| Nuosperse 657 | Dispersant | Durham Raw Materials | 3.5 |
| Titanium Dioxide | | | 149.0 |

The above ingredients were mixed in a water-cooled pot using a Cowles blade at 4,000 r.p.m. until a Hegman Gauge reading of <10 μm was obtained. The speed of the stirrer was reduced to 2,000 r.p.m. and the following added separately to the mix; the ingredients are listed in their order of addition:

| Ingredient | Description/Function | Grams |
|---|---|---|
| Solvent mixture | As above | 42.5 |
| Organoclay | | 3.07 |

The stirrer speed was increased to 4,000 r.p.m. and the ingredients mixed for 30 minutes at which time a Hegman Gauge reading was taken.

Component B is separately prepared by mixing the following miscible ingredients.

| Ingredient | Description/Function | Supplier | Grams |
|---|---|---|---|
| Versamide 115 | Polyamide liquid curing agent (amine value 210-220 mg KOH/g) | Cray Valley Products | 56.0 |
| Xylene | | | 35.0 |

Samples of the component A with organoclay and solvent were allowed to stand for 15 minutes and were then tested for viscosity at 21° C. using a Brookfield RVT Viscometer at speeds of 1 r.p.m., 10 r.p.m., and 100 r.p.m.

A sample of the component A prepared in an identical manner but containing no organoclay was also tested for viscosity in the same way. Results are shown in Table 6.

TABLE 6

| Milli-Equivalents Quaternary Ammonium Compound per 100 g clay | Concentration of $Al^{3+}$ ions in Aqueous Suspension M | Viscosity cp | | | Hegman Gauge Reading m |
|---|---|---|---|---|---|
| | | 0.5 r.p.m. | 10 r.p.m. | 100 r.p.m. | |
| 110 | 0 | 21000 | 3950 | 1060 | +50 |
| 110 | 0.0025 | 28000 | 4750 | 1200 | 30 |
| 110 | 0.005 | 23000 | 4100 | 1040 | 10 |
| 100 | 0.0025 | 32000 | 5400 | 1460 | 30 |
| 105 | 0.0025 | 27000 | 4600 | 1310 | 20 |
| No Organoclay | | 11000 | 2200 | 660 | 10 |

It can be seen from the data in Example V and Table 5 that cross-linkable unsaturated polyester compositions having a thixotropic index of above about 2.5, preferably above about 3.0 and more preferably at least about 4.0, can be obtained by means of the subject invention. It can also be seen from Example VI that the organoclay of this invention is readily dispersible in a polar organic solvent system.

We claim:

1. Resin compositions comprising a resin and a readily dispersible organoclay, said organoclay being prepared by a method comprising the steps of:
   (a) suspending a smectite clay in water to form an aqueous suspension;
   (b) treating said aqueous suspension of the smectite clay with a solution of an inorganic salt, wherein the cation of said inorganic salt has a valency of at least 2, the concentration of the salt being such as to flocculate the smectite clay substantially completely;
   (c) mixing the suspension of the flocculated smectite clay with a quaternary ammonium compound at least one of the four alkyl groups of which has from 10 to 24 carbon atoms; and
   (d) dewatering the product of step (c).

2. Compositions in accordance with claim 1 wherein the valency of said cation is 3.

3. Compositions in accordance with claim 2, wherein said cation is aluminum.

4. Compositions in accordance with claim 2, wherein the concentration of the solution of the salt containing the cation is in the range of 0.001 M to 0.02 M.

5. Compositions in accordance with claim 1, wherein the valency of said cation is 2, and wherein the concentration of the solution of the salt containing the cation is in the range of from about 0.2 M to 2 M.

6. Compositions according to claim 1, wherein the dewatered product of step (c) is dried and milled.

7. Compositions according to claim 1, wherein the quaternary ammonium compound mixed with the aqueous suspension of the smectite clay is molten.

8. Compositions according to claim 1, wherein the quaternary ammonium compound can be represented by the general formula:

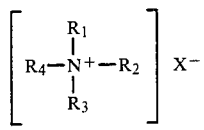

wherein $R_1$ is selected from saturated and unsaturated alkyl groups having from 10 to 24 carbon atoms, $R_2$ and $R_3$, which may be the same or different, are each selected from saturated and unsaturated alkyl groups having from 1 to 24 carbon atoms and aralkyl groups having from 7 to 10 carbon atoms, $R_4$ is selected from alkyl groups having from 1 to 6 carbon atoms and aralkyl groups having from 7 to 10 carbon atoms, and X is selected from OH, Cl, Br, I, $NO_2$, $CH_3SO_4$ and $CH_3COO$.

9. Compositions according to claim 8, wherein the quaternary ammonium compound is selected from the group consisting of benzyl methyl dialkyl ammonium chlorides, dimethyl dialky ammonium chlorides, benzyl dimethyl alkyl ammonium chlorides, benzyl trialkyl ammonium chlorides and methyl trialkyl ammonium chlorides in which the one or more alkyl group represents a mixture of hydrocarbon radicals derived from tallow having from 14 to 20 carbon atoms.

10. Compositions according to claim 1, wherein the smectite clay is mixed with the quaternary ammonium compound in proportions such that there are present from 95 to 140 milliequivalents of quaternary ammonium cation per 100 g of dry clay.

11. Resin compositions according to claim 1, in which the resin is selected from the group consisting of alkyd resins, unsaturated polyester resins and epoxy resins.

12. Resin compositions according to claim 11, in which the resin is an unsaturated polyester resin.

13. Resin compositions according to claim 11, being coating formulations.

14. Resin compositions according to claim 12 in which the resin is used as an unsaturated polyester/styrene system.

15. An organoclay dispersed in a polar organic solvent system, or an aliphatic organic solvent system, said organoclay being prepared by a method comprising the steps of:
   (a) suspending a smectite clay in water to form an aqueous suspension;
   (b) treating said aqueous suspension of the smectite clay with a solution of an inorganic salt wherein the cation of said inorganic salt has a valency of at least 2, the concentration of the salt being such as to flocculate the smectite clay substantially completely;
   (c) mixing the suspension of the flocculated smectite clay with a quaternary ammonium compound at least one of the four alkyl groups of which has from 10 to 24 carbon atoms; and
   (d) dewatering the product of step (c).

* * * * *